US009923257B2

(12) United States Patent
Poddar et al.

(10) Patent No.: US 9,923,257 B2
(45) Date of Patent: Mar. 20, 2018

(54) BALUN CIRCUIT

(71) Applicant: Synergy Microwave Corporation, Paterson, NJ (US)

(72) Inventors: Ajay Kumar Poddar, Elmwood Park, NJ (US); Ulrich Rohde, Upper Saddle River, NJ (US); Shiban K. Koul, Hauz Khas (IN)

(73) Assignee: Synergy Microwave Corporation, Paterson, NJ (US)

( * ) Notice: Subject to any disclaimer, the term of this patent is extended or adjusted under 35 U.S.C. 154(b) by 242 days.

(21) Appl. No.: 14/680,584

(22) Filed: Apr. 7, 2015

(65) Prior Publication Data

US 2015/0288344 A1 Oct. 8, 2015

Related U.S. Application Data

(60) Provisional application No. 61/976,199, filed on Apr. 7, 2014.

(51) Int. Cl.
*H01P 5/10* (2006.01)
*H04B 1/30* (2006.01)

(52) U.S. Cl.
CPC .............. *H01P 5/1007* (2013.01); *H01P 5/10* (2013.01); *H04B 2001/307* (2013.01)

(58) Field of Classification Search
CPC ......... H01P 5/10; H01P 5/1007; H05K 1/025; H04B 2001/307; H04B 1/30
USPC .......... 333/25, 26, 238, 246; 455/326, 189.1
See application file for complete search history.

(56) References Cited

U.S. PATENT DOCUMENTS

| 3,523,260 | A | * | 8/1970 | Gunshinan | ............... H01P 5/10 333/238 |
| 2006/0091974 | A1 | | 5/2006 | Feldman | |
| 2007/0001779 | A1 | | 1/2007 | Asamura et al. | |
| 2009/0140823 | A1 | * | 6/2009 | Lee | ........................... H01P 5/10 333/26 |
| 2013/0162366 | A1 | | 6/2013 | Essenwanger | |
| 2015/0145745 | A1 | * | 5/2015 | Nguyen | .................... H01P 5/10 343/853 |

FOREIGN PATENT DOCUMENTS

JP S6075101 A 4/1985

OTHER PUBLICATIONS

Machine English Translation of JP 60-75101 A.*

(Continued)

*Primary Examiner* — Benny Lee
*Assistant Examiner* — Jorge Salazar, Jr.
(74) *Attorney, Agent, or Firm* — Lerner, David, Littenberg, Krumholz & Mentlik, LLP

(57) ABSTRACT

The present disclosure is directed to a balun circuit adapted to operate at a frequency of between about 5 GHz to about 110 GHz. The balun circuit includes first and second output striplines and an input stripline formed on a first surface of the substrate, and a slotline formed on a second surface of the substrate opposite the first surface. The slotline has first and second ends, the first end overlapping the first output stripline and the second end overlapping the second output stripline, and the input stripline overlapping the slotline midway between the first end and the second end.

29 Claims, 13 Drawing Sheets

(56) References Cited

OTHER PUBLICATIONS

Chang K et al: "Ultrawide-Band Transitions and New Microwave Components Using Double-Sided Parallel-Strip Lines", IEEE Transactions on Microwave Theory and Techniques, IEEE Service Center, Piscataway, NJ, US, vol. 52, No. 9, Sep. 1, 2884 (Sep. 1, 2004), pp. 2148-2152, XP811118096.
Partial International Seach Report for Application No. PCT/US2015/024712 dated Feb. 17, 2016.

\* cited by examiner

BALUN CIRCUIT

CROSS-REFERENCE TO RELATED APPLICATIONS

The present application claims the benefit of the filing date of U.S. Provisional Patent Application No. 61/976,199 filed Apr. 7, 2014, the disclosure of which is hereby incorporated herein by reference.

FIELD OF THE INVENTION

The present disclosure relates to balun circuits, to bandwidth improvements of such circuits in planar microwave transmission structures. Such improvements may be realized, for example, in a microstrip-slotline transition medium.

BACKGROUND

A balun circuit typically takes the form of a three-port passive device that may be used to connect balanced circuits (e.g., an antenna) to unbalanced circuits. For example, the balun circuit may provide a connection between one unbalanced transmission line and two balanced transmission lines. In such an example, the balun circuit may be designed such that the balanced transmission lines output signals that are equal in magnitude but with a phase difference of 180 degrees.

One type of balun circuit for transmission of microwave signals uses a microstrip-to-slotline transition. This transition generally includes a single input stripline and single output stripline coupled to one another via a slotline. Conventional microstrip-to-slotline transition balun circuits are subject to bandwidth and frequency constraints. As such, there is a need for a ultra-wideband microstrip-to-slotline transition balun circuit. Such circuits may desirably work at frequencies greater than 11 GHz, greater than 45 GHz, or up to and beyond 110, and even 200 GHz.

BRIEF SUMMARY OF THE INVENTION

One aspect of the disclosure provides for a balun circuit including a substrate, an output stripline having coplanar first and second branches formed on a first surface of the substrate, an input stripline formed on the first surface of the substrate, and one or more slotlines formed in a ground plane on a second surface of the substrate. The one or more slotlines may form a transmission path between the input stripline and the first and second output stripline branches. The balun circuit may further include a triangular metallization formed on the ground plane, at least a portion of the first branch being positioned in line with a first edge of the metallization, and at least a portion of the second branch being positioned in line with a second edge of the metallization.

In some examples, each of the first and second branches of the output stripline may be of uniform width. The second branch of the output stripline may be arranged symmetrical with the first branch. Each of the first and second branches of the output stripline, and the input stripline, may also include a termination point with an open end discontinuity.

In some examples, the balun circuit may include two slotlines in parallel with each other, the first slotline forming a transmission path between the input stripline and the first branch of the output stripline, and a second slotline forming a path between the input stripline and the second branch of the output stripline. The distance between the two parallel slotlines may be between about 50 microns and about 100 microns. Each end of each of the slotlines may include a termination point with an open end discontinuity (e.g., a radial stub). Each of the first branch of the output stripline, the second branch of the output stripline, and the input stripline may includes such a termination point with an open end discontinuity. Furthermore, the termination points of the input striplines, first and second slotlines, and first and second branches of the output stripline may be different in dimensions from one another.

Another aspect of the present disclosure is directed to a balun circuit including a substrate, a first output stripline formed on a first surface of the substrate, a second output stripline formed on the first surface of the substrate, an input stripline formed on the first surface of the substrate, and a slotline formed on a second surface of the substrate opposite the first surface. The slotline may have a first end overlapping the first output stripline, and a second end overlapping the second output stripline, and the input stripline may overlap the slotline midway between the first end and the second end. In this respect, the slotline may form a microstrip-to-slotline cross junction transition with each of the microstrip input and output lines. At least one of the input stripline, the first output stripline, and the second output stripline may extend from a side of the substrate to its respective microstrip-to-slotline cross junction transition along a straight line. Additionally, the first output stripline and a second output stripline may be substantially rotationally symmetrical with one another.

The slotline may be adapted to overlap the first output stripline at a respective root of the termination points of each of the first end and the first output stripline. The slotline may also be adapted to overlap the second output stripline at a respective root of the termination points of each of the second end and the second output stripline. Each of the first and second output striplines may be of a non-uniform width that gradually widens in the direction moving away from the slotline, and the input stripline may be of a uniform width.

Each of the first and second output striplines may be bent at an approximately 90 degree angle, and the input stripline may be straight. Alternatively, each of the first and second output striplines may be straight, and the input stripline may be bent at an approximately 90 degree angle.

In some examples, the first output stripline may extend between the slotline and a first end of the substrate, the second output stripline may extend between the slotline and a second end of the substrate opposite the first end, and the input stripline may extend between the slotline and a third end of the substrate between the first and second ends.

Also, in some examples, the first and second output striplines may be adapted to provide a characteristic impedance of about 70 ohms and a differential impedance of about 140 ohms.

A further aspect of the present disclosure is directed to a double balanced mixer circuit including two of the balun circuits described above, and a switch (e.g., having a crossover quad diode ring) coupled to each of the balun circuits and operative to mix the respective output frequencies of the first and second balun circuits. The mixer circuit may be formed on a single substrate, and the respective input lines of the balun circuits may both be straight, extending between first and opposite second ends of the substrate. In some examples, the balun circuits may rotationally symmetrical with one another.

Yet another aspect of the disclosure provides for a balun circuit formed on a substrate, having an input stripline, coplanar first and second output striplines, and one or more coplanar slotlines (i.e., the slotlines being coplanar with each other) connecting the input stripline and the coplanar first and second output striplines. The first and second output striplines may be adapted to provide an impedance transformation ratio of greater than 1:1 (e.g., a characteristic impedance of about 200 ohms and an impedance transformation ratio of about 1:4). Additionally or alternatively, the balun circuit may be adapted to provide a characteristic impedance of about 150 ohms. In some examples, the balun circuit may be adapted to operate at a frequency greater than 11 GHz, and/or at any frequency between about 5 to about 30 GHz, between about 5 to about 45 GHz, between about 5 to about 110 GHz, or between about 5 to about 200 GHz.

DETAILED DESCRIPTION

Figure 1A:
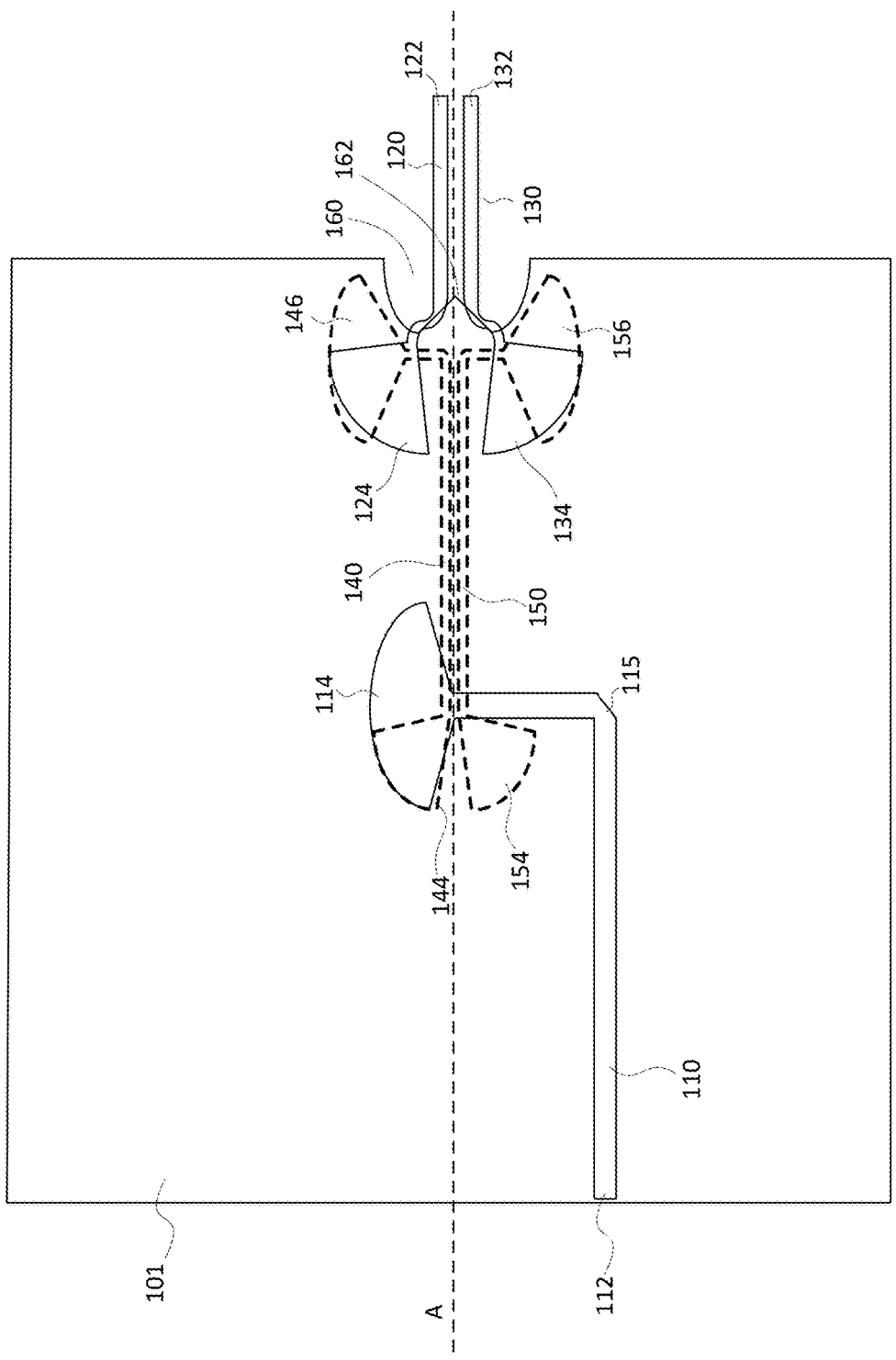
FIG. 1A is a plan view of a balun circuit in accordance with an aspect of the present disclosure.

FIG. 1A shows a first example balun circuit 100 in accordance with the present disclosure. The balun circuit 100 is formed on a substrate 101. In the example of FIG. 1, the substrate is made of a dielectric material (e.g., Rogers substrates, laminates, low-temperature co-fired ceramics, sapphire, etc.). Also in the example of FIG. 1, the substrate is roughly square-shaped. However, in other examples, the substrate may be shaped differently (e.g., rectangle, circle, etc.).

The balun circuit 100 includes an input stripline 110, two coplanar output striplines 120 and 130 (e.g., striplines), and a pair of slotlines 140 and 150. Each of the striplines is formed on a first surface of the substrate 101, and each of the slotlines 140 and 150 (shown in FIG. 1A by dashed lines) is formed in the ground plane on a second surface of the substrate 101. A first slotline 140 connects the input stripline 110 to a first of the output striplines 120 through the dielectric substrate, and a second slotline 150 connects the input stripline 110 to a second of the output striplines 130 through the dielectric substrate.

The input stripline 110 is of uniform width includes a first end (or termination point) 112, a second end 114, and a bend 115. The first end 112 is open, and functions as an input port for the balun circuit 100. The second end 114 is closed, but with an open end discontinuity (e.g., a radial stub) to simulate an open circuit at the second end. The bend 115 connects the first and second ends at about a 90 degree angle, thereby enabling the input stripline 110 to overlap each of the connecting slotlines.

The first branch 120 of the coplanar output striplines is preferably of a uniform width and includes a first end 122 and a second end 124. As with the first end 112 of the input line 110, the first end of the first branch 120 of the coplanar output striplines is open ended, thereby functioning as a first output port for the balun circuit. In the example of FIG. 1A, the input port 112 of the balun circuit 100 is located on a first end of the substrate 101, and the output port 122 is located on a second, opposing end of the substrate 101. Additionally, as with the second end 114 of the input line 110, the second end of the first branch 120 of the coplanar output striplines is closed, but with an open end discontinuity (e.g., a radial stub).

The second branch 130 of coplanar output striplines substantially in parallel, and symmetrical (e.g., having mirror symmetry along a primary axis A extending from the input port side to the output port side of the substrate 101) with the first branch 120. As such, the first end 132 and second end 134 of the second branch 130 are comparable to those of the first branch 120. The distance between the first and second branches is selected to yield a desired impedance, which may be greater than 50 ohms. In this respect, for a balun circuit having an input stripline with an input impedance of 50 ohms, the impedance ratio of the balun circuit may be greater than 1:1 (e.g., 1:2 or 1:4). In the example of FIG. 1A, the selected distance is about 0.4 millimeters, which results in an output impedance of 200 ohms, making the impedance ratio of the balun circuit 50:200 or 1:4. In other examples, the selected distance may be larger, and may result in a different output impedance depending on various properties of the balun circuit.

The first slotline 140 includes a first end 144 and a second end 146. The first end 144 is positioned to overlap the second end 114 of the input line 110, thereby forming a cross-junction transition, or transmission path, between the input line 110 and the first slotline 140. The second end 146 is positioned to overlap the second end 124 of the first branch 120, thereby forming a cross-junction transition between the first slotline 140 and the first branch 120. Each of the first and second ends of the first slotline 140 is closed, but with an open end discontinuity (e.g., a radial stub). The cross-junction transitions are formed at the overlapping roots of each of the open end discontinuities.

The second slotline 150 is coplanar, in parallel, and symmetrical (e.g., having mirror symmetry along a primary axis A) with the first slotline 140. As such, the first end 154 and second end 156 of the second slotline 150 are comparable to those of the first slotline 140. In the example of FIG. 1A, the width of the metal between the slotlines is between about 50-100 microns, although in other examples the distance may be narrower or wider.

The first ends of the slotlines 144 and 154 are positioned to overlap the second end 114 of the input line 110 in such a way that the root of the radial stub of the second end 114 of the input line intersects at a point midway between the two slotlines 140 and 150 and is aligned, in the same line vertically (e.g., perpendicular to axis A), with the roots of the radial stubs of the first ends of the slotlines 144 and 154, thereby forming a cross-junction transition between the input line 110 and each of the slotlines 140 and 150.

In the example of FIG. 1A, the substrate 101 also includes a groove 160 etched into a side of the substrate having the output ports. An isosceles triangular metalized section 162 is etched onto the ground plane of the substrate and extends into the groove 160. Each of the first and second branches 120 and 130 is bent in a manner that follows along or in line with a respective edge of a triangular taper 160 on the surface of the substrate 101. The purpose of the taper 160, and of positioning the output lines in line with the edge of the taper, is to facilitate impedance matching of the output lines, thereby avoiding any abrupt discontinuities at the slotline-to-microstrip cross junction transition (e.g., at the roots of the second ends 124, 134 of the coplanar output striplines 120, 130).

In the example of FIG. 1A, each of the open end discontinuities is a radial stub. In other examples, the microstrip and slotline ends may include different open end discontinuities (e.g., flared open end, circular open end, combination of flare and circular open end, etc.). Also, in the example of FIG. 1A, the radial stubs of the input stripline 114 and the first ends of the first and second slotlines 144 and 154 all have the same dimensions. Similarly, the radial stubs of the first and second branches of the coplanar output striplines 124 and 134, and the second ends of the first and second slotlines 146 and 156 all have the same dimensions. However, the dimensions of stubs 114, 144 and 154 are different than those of stubs 124, 134, 146 and 156.

Operation of the balun circuit 100 of FIG. 1A is as follows. An input signal propagates through the input stripline 110 and is transmitted to each of the first and second slotlines 140 and 150 through the cross-junction transition. The transmitted signals in each of the slotlines are aligned with one another, but have slightly different amplitudes, due to the asymmetry in the balun circuit design. The signals in the slotlines then excite each of the first and second output striplines 120 and 130 in opposite directions. For instance, if the input signal has an electric field in one direction (e.g., into the page of the figure), the output signal of the first branch 120 will have an electric field in the same direction, whereas the output signal of the second branch 130 will have an electric field in the opposite direction (e.g., out of the page of the figure). In this respect, the outputs at each of the output ports 122 and 132 carry a transmission having about the same amplitude and frequency as one another, but with a phase difference of approximately 180 degrees. This is accomplished by aligning the output lines relative to their corresponding slotlines in opposite directions.

Figure 1B:
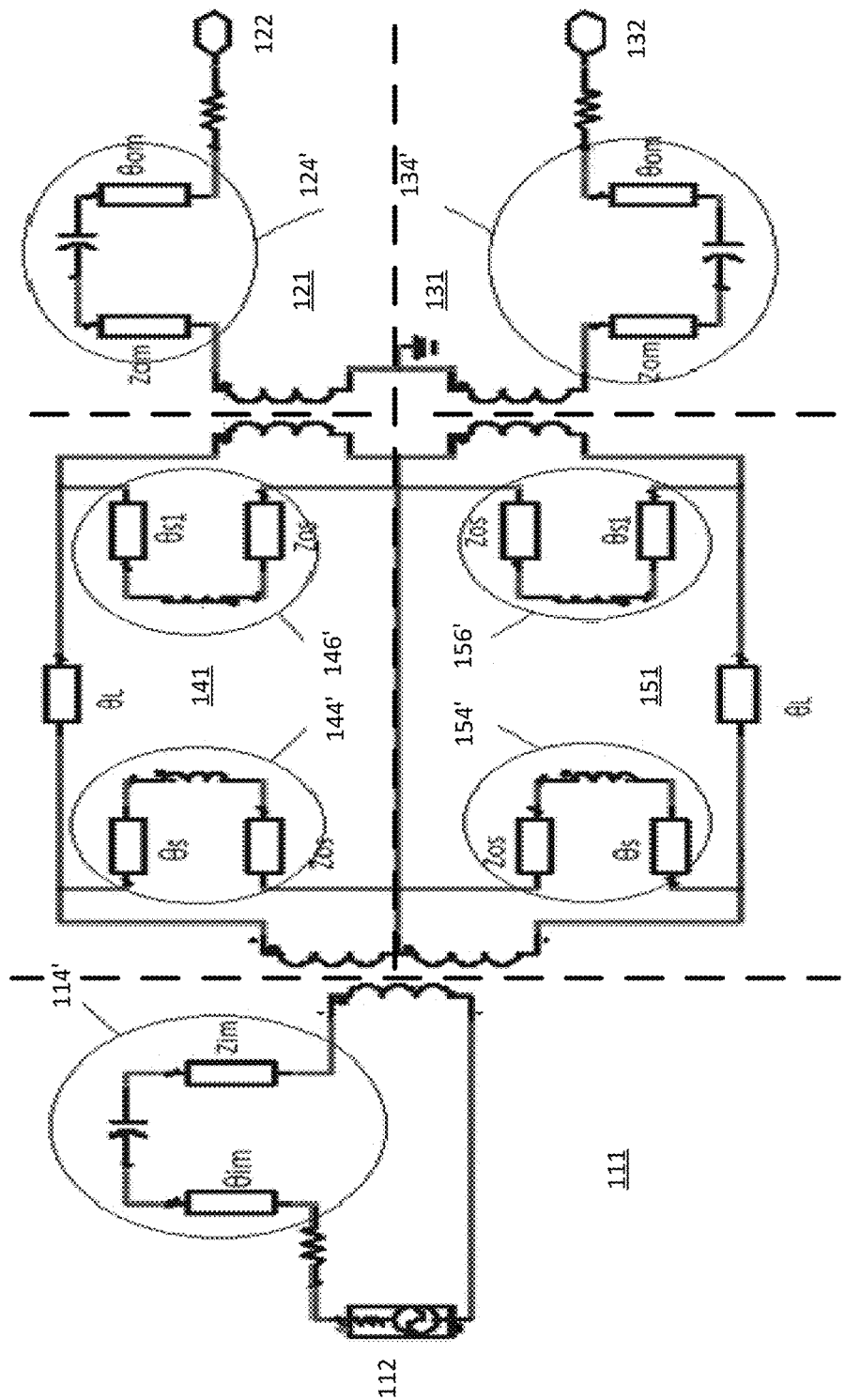
FIG. 1B is an equivalent circuit diagram corresponding to the balun circuit of FIG. 1A.

FIG. 1B is a diagram of an equivalent circuit of the balun circuit 100 of FIG. 1A. As shown in FIG. 1B, region 111 is an equivalent circuit of the input stripline 110 of FIG. 1A, region 121 is an equivalent circuit of the first coplanar output stripline 120, region 131 is an equivalent circuit of the second coplanar output stripline 130, region 141 is an equivalent circuit of the first slotline 140, and 151 is an equivalent circuit of the first slotline 150. The regions are separated by the dashed lines in FIG. 1B. Each of the open end discontinuities of the microstrips and slotlines has an impedance and electrical length (Zim and θim for the radial stub of the input stripline 114'; Zos and θs for the first end radial stub of each slotline 144' and 154'; Zos and θs1 for the second end radial stub of each slotline 146' and 156'; and Zom and θom for the radial stub of each microstrip output 124' and 134'). Zl and θL represent the characteristic impedance and electrical length respectively of each slotline 140 and 150.

Figure 2A:
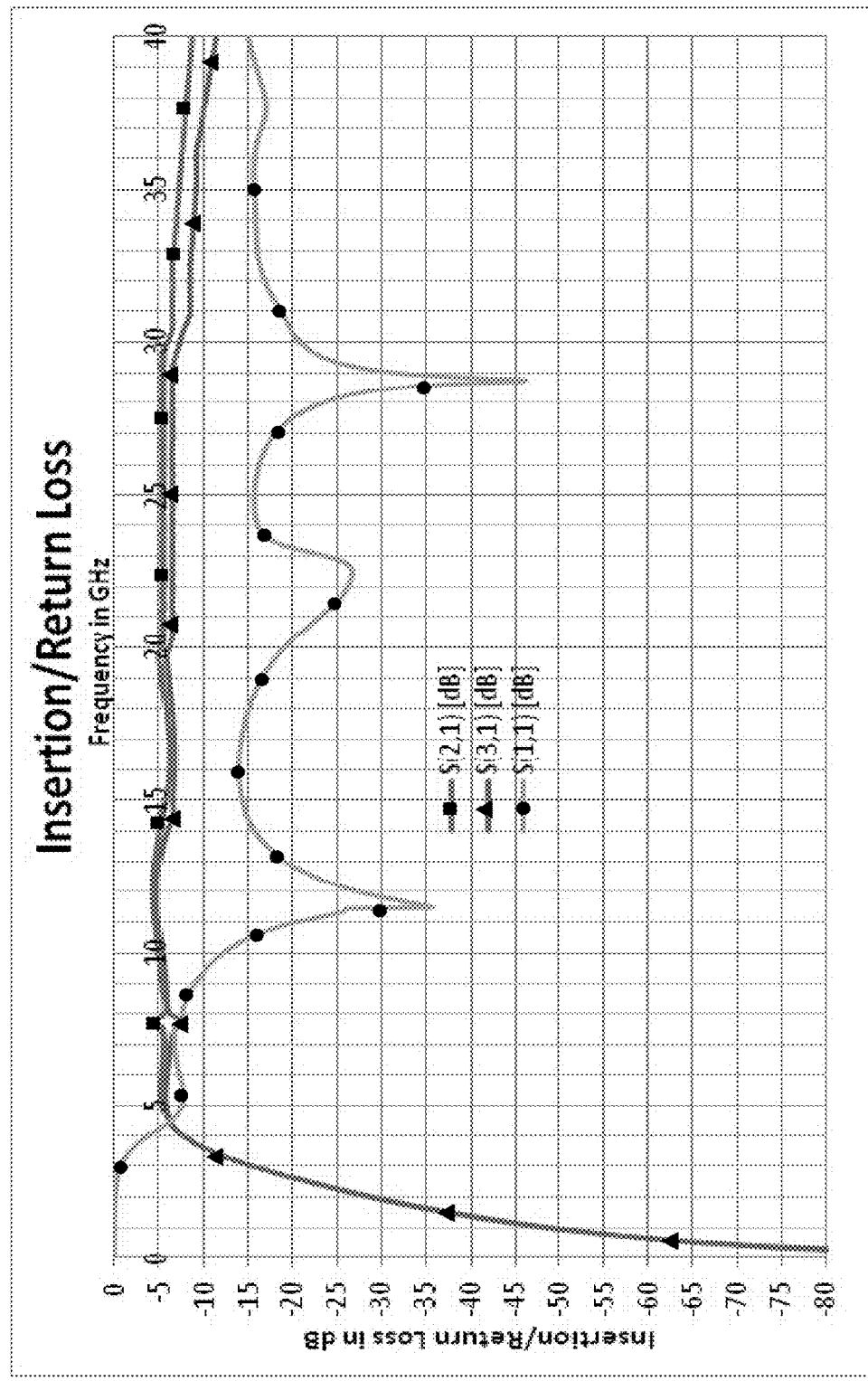
FIG. 2A is a graphical representation of loss characteristics of the balun circuit of FIG. 1A.
Figure 2B:
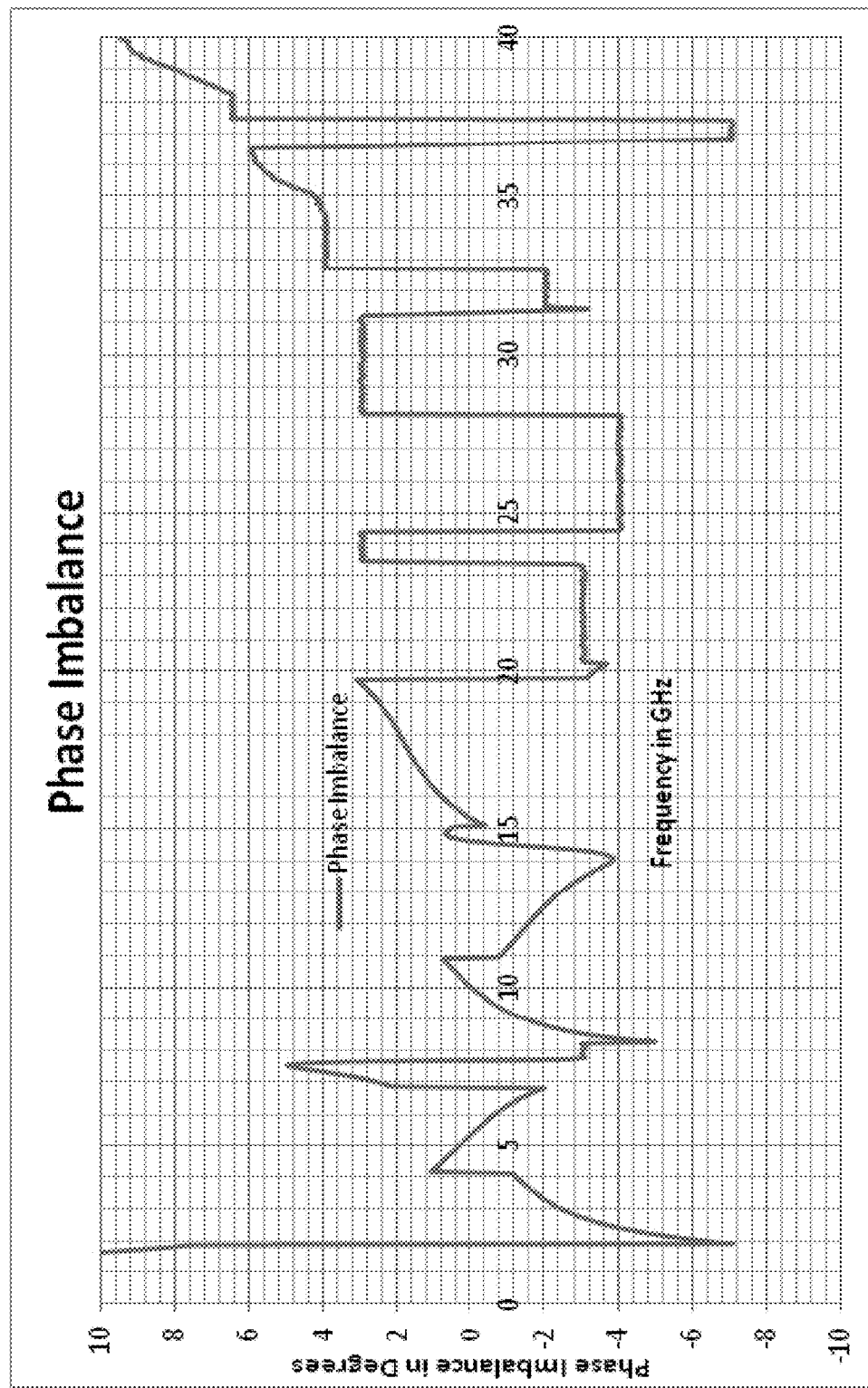
FIG. 2B is a graphical representation of phase imbalance characteristics of the balun circuit of FIG. 1A.

FIGS. 2A and 2B show insertion loss and phase imbalance characteristics of the balun circuit of FIG. 1A over a range of frequencies. As shown in FIG. 2A, the amplitude balance of the balun circuit is about 5 dB or less for frequencies up to about 35 GHz. Also, as shown in FIG. 2B, the phase balance of the balun circuit is about ±5.5 degrees for frequencies up to about 35 GHz, and ±8.5 degrees for frequencies up to about 40 GHz. Therefore, the example balun of FIG. 1A may be operated at any frequency between about 5 GHz and about 35 GHz (including operating frequencies greater than 11 GHz, as well as operating frequencies greater than about 30 GHz). The characteristics of FIGS. 2A and 2B are based on a balun circuit formed on a Rogers RO4003C substrate with a thickness of about 0.2 millimeters, a relative permittivity of 3.55, and a loss tangent of 0.0021, although in other examples the balun circuit may have a different thickness and have a different permittivity and/or loss tangent.

The example balun circuit of FIG. 1A includes two coplanar and parallel slotlines 140 and 150. However, other example balun circuits may include a single slotline connecting an input stripline to both first and second coplanar output striplines. The open end discontinuity at the output end of the slotline may be a circular opening, with portions of the first and second coplanar output striplines overlaying over the respective sides of the circular opening.

Figure 3A:
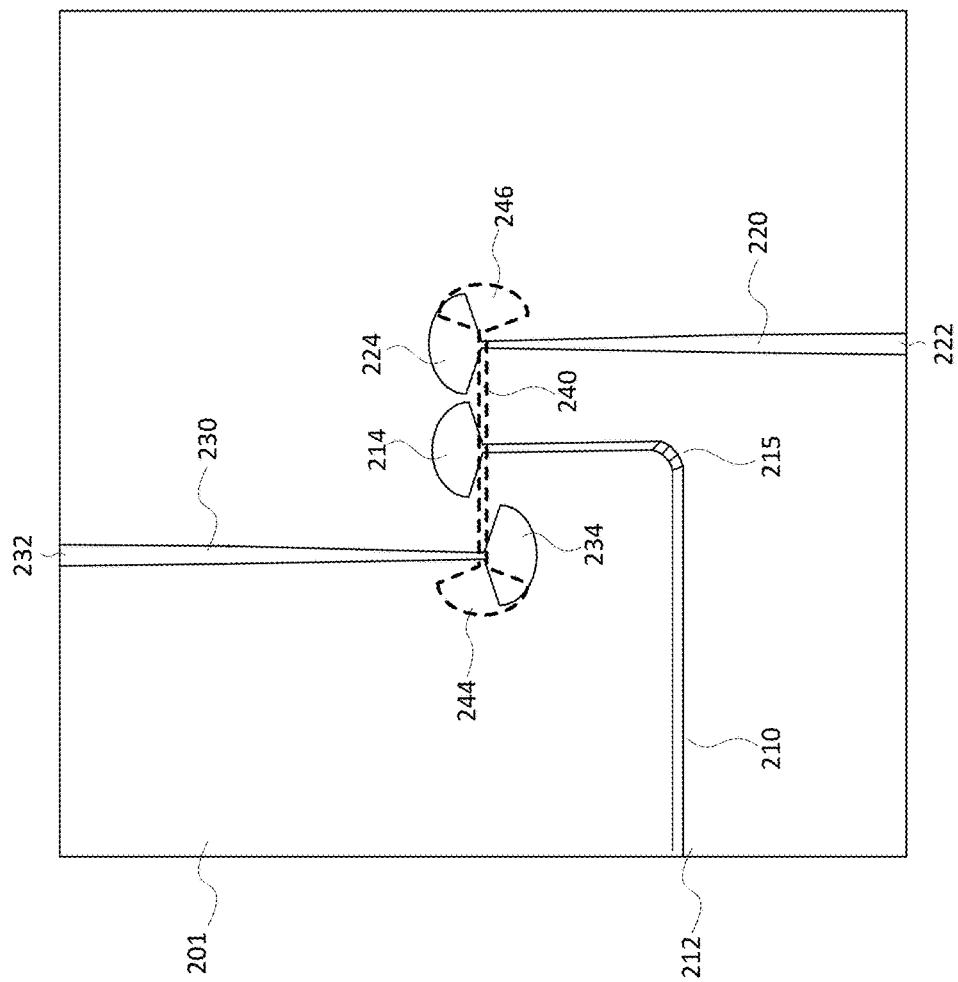
FIG. 3A is a plan view of another balun circuit in accordance with an aspect of the present disclosure.

FIG. 3A shows a second example balun circuit 200 in accordance with the present disclosure. The balun circuit 200 is formed on a dielectric substrate 201 with a ground plane, comparable to the substrate of the example of FIG. 1A.

The balun circuit 200 of FIG. 3A includes an input stripline 210 having a first end 212 (input port), a second end 214 (radial stub) and bend 215. In the example of FIG. 3A, the bend is about 90 degrees and is curved, but in other examples may have a different angle and different forms of bends (e.g., right angle, curved, a single miter joint, etc.). A root of the radial stub of the second end overlaps a midpoint of the slotline 240. The balun circuit also includes first and second output striplines 220 and 230. Each of the output lines includes a first end 222 and 232 (output ports) and a second end 224 and 234 (radial stubs), and is straight (as compared to the bent input stripline 210). The radial stub root of each second end overlays the root of a radial stub at a respective end 244 and 246 of the slotline 240.

In the example of FIG. 3A, each of the input port 212, and two output ports 222 and 232 are formed on different sides of the substrate 201. Specifically, a first output port 222 (associated with a first output stripline 220) is positioned on a first side of the substrate, a second output port 232 (associated with a second output stripline 230) is positioned on an opposite second side of the substrate, and the input port 212 is positioned on a third side of the substrate between the first and second sides.

The input stripline 210 and the slotline 240 are typically of a uniform width, whereas the output striplines 220, 230 are typically of a non-uniform width. Specifically, the output striplines 220, 230 are tapered, having a first width at the second end and gradually widening (i.e., in the direction moving away from the slotline 240) to a second width at the first end. The tapers in the striplines facilitate impedance matching (e.g., from about 70 ohms at the root of the radial stubs to about 50 ohms at the output ports). In the example of FIG. 3A, each of the tapers is approximately linear, although the taper may be of different dimensions in other examples.

In the example of FIG. 3A, the radial stubs of the input stripline 214 and output striplines 224 and 234 may or may not have the same dimensions, and the radial stubs at the first and second ends 244 and 246 of the slotline have the same dimensions. However, the dimensions of stubs 214, 224 and 234 may be different than those of stubs 244 and 246.

Several aspects of the balun circuit 200 are formed symmetrically to achieve the desired insertion loss and phase imbalance characteristics discussed in connection with FIGS. 4A and 4B below. Those aspects include but are not limited to: the balun circuit 200 utilizing a single slotline 240 to transmit signals from the input stripline 210 to the first and second output striplines 220 and 230; the junction transition between the input stripline and the slotline being positioned at a midpoint of the slotline; the slotline being of a uniform width; the junction transitions between the slotline and each output stripline being positioned at an equal distance from the junction transition with the input stripline; and each of the output striplines being rotationally symmetrical to one another.

Operation of the balun circuit 200 of FIG. 3A is comparable to that of the balun circuit 100 of FIG. 1A, except that the input signal is propagated along a single slotline instead of along two parallel slotlines. By aligning the output lines in opposite directions relative to the slotline, the difference in phase of the transmitted signals at each junction is approximately 180 degrees, thereby yielding the balanced output of the circuit 200.

Figure 3B:
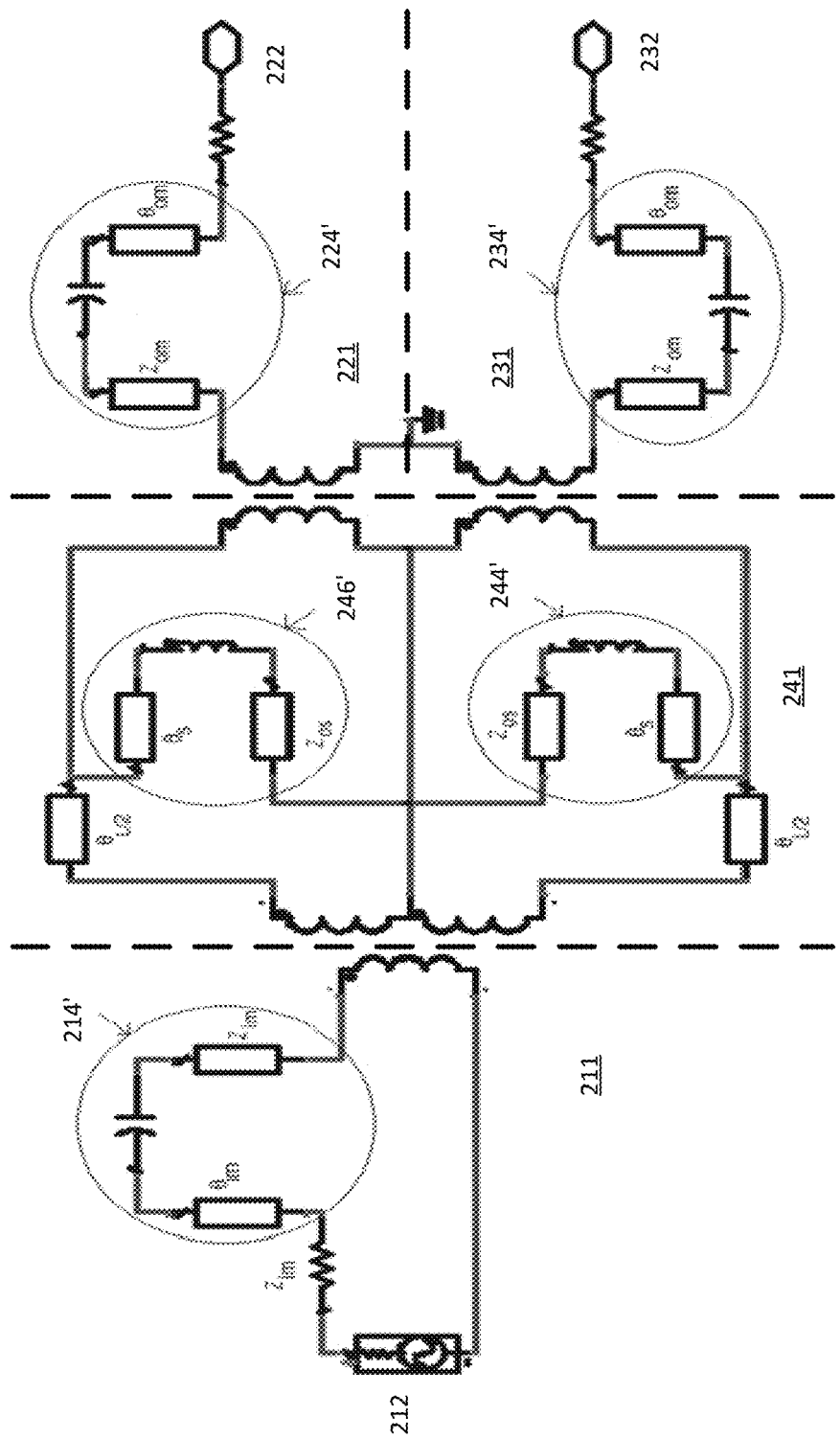
FIG. 3B is an equivalent circuit diagram corresponding to the balun circuit of FIG. 3A.

FIG. 3B is a diagram on an equivalent circuit of the balun circuit 200 of FIG. 3A. As shown in FIG. 3B, region 211 is an equivalent circuit of the input stripline 210 of FIG. 3A, region 221 is an equivalent circuit of the first output stripline 220, region 231 is an equivalent circuit of the second output stripline 230, and region 241 is an equivalent circuit of the slotline 240. Each of the open end discontinuities of the microstrips and slotlines has an impedance and electrical length (Zim and θim for the radial stub of the input stripline 214'; Zos and θs for the radial stubs of the slotline 244' and 246'; and Zom and θom for the radial stub of each output stripline 224' and 234'). Zl, θL/2 represents the characteristic impedance and electrical length of half of the slotline 240, since a signal transmitted from the input stripline to either output stripline propagates across only half of the slotline.

Figure 4A:
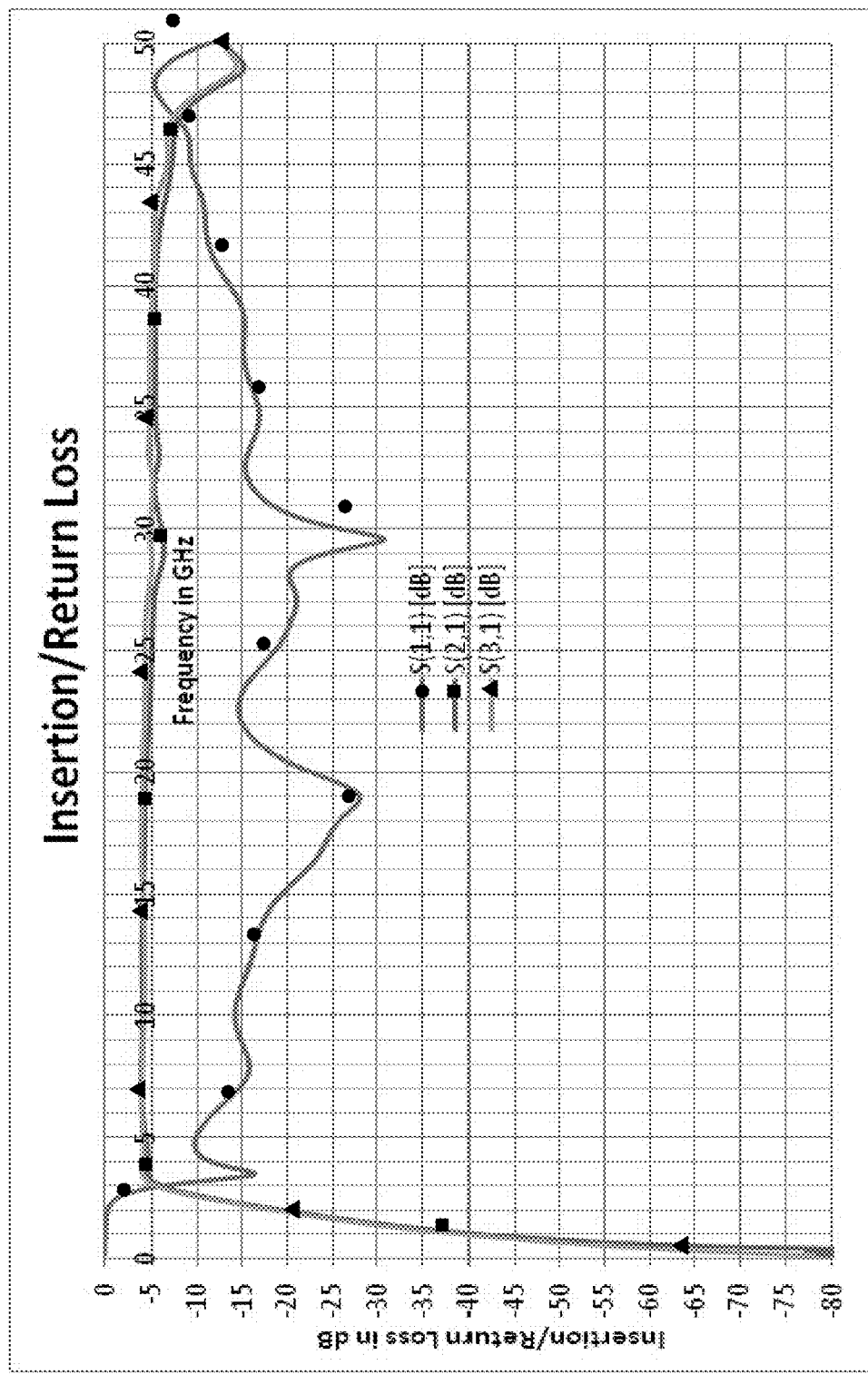
FIG. 4A is a graphical representation of loss characteristics of the balun circuit of FIG. 3A.
Figure 4B:
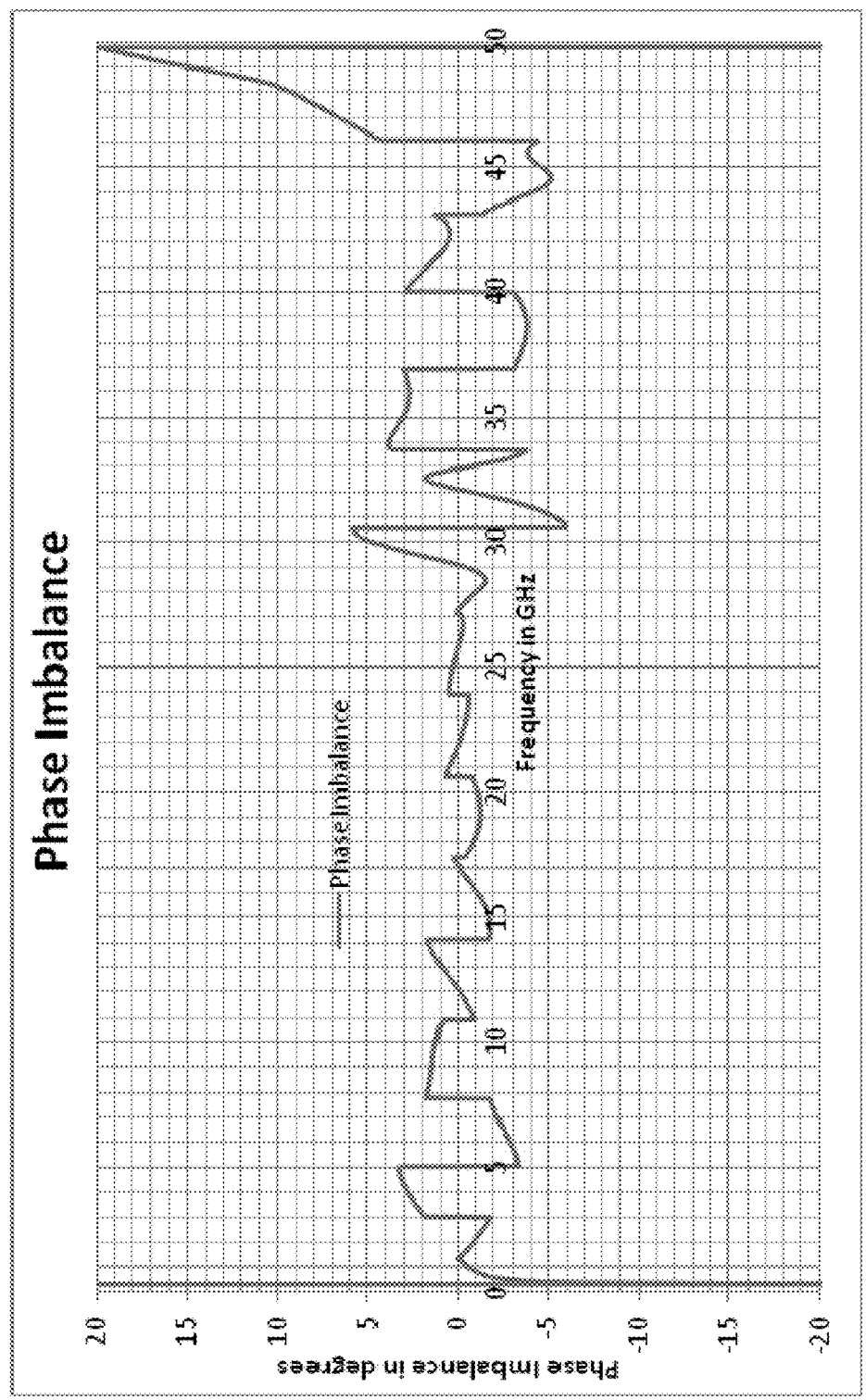
FIG. 4B is a graphical representation of phase imbalance characteristics of the balun circuit of FIG. 3A.

FIGS. 4A and 4B show insertion loss and phase imbalance characteristics of the balun circuit of FIG. 3A over a range of frequencies. As shown in FIG. 4A, the amplitude balance of the balun circuit is about 1 dB or less for frequencies up to about 47 GHz. Also, as shown in FIG. 4B, the phase balance of the balun circuit is about ±5.0 degrees for frequencies up to about 47 GHz. Therefore, the example balun of FIG. 3A may be operated at any frequency between about 3 GHz and 47 GHz (including operating frequencies greater than 11 GHz, as well as operating frequencies greater than about 45 GHz). The characteristics of FIGS. 4A and 4B are based on a balun circuit formed on a Rogers RO4003C substrate with a thickness of about 0.2 millimeters, a relative permittivity of 3.55, and a loss tangent of 0.0021, although in other examples the balun circuit may have a different thickness and have a different permittivity and/or loss tangent.

Figure 5:
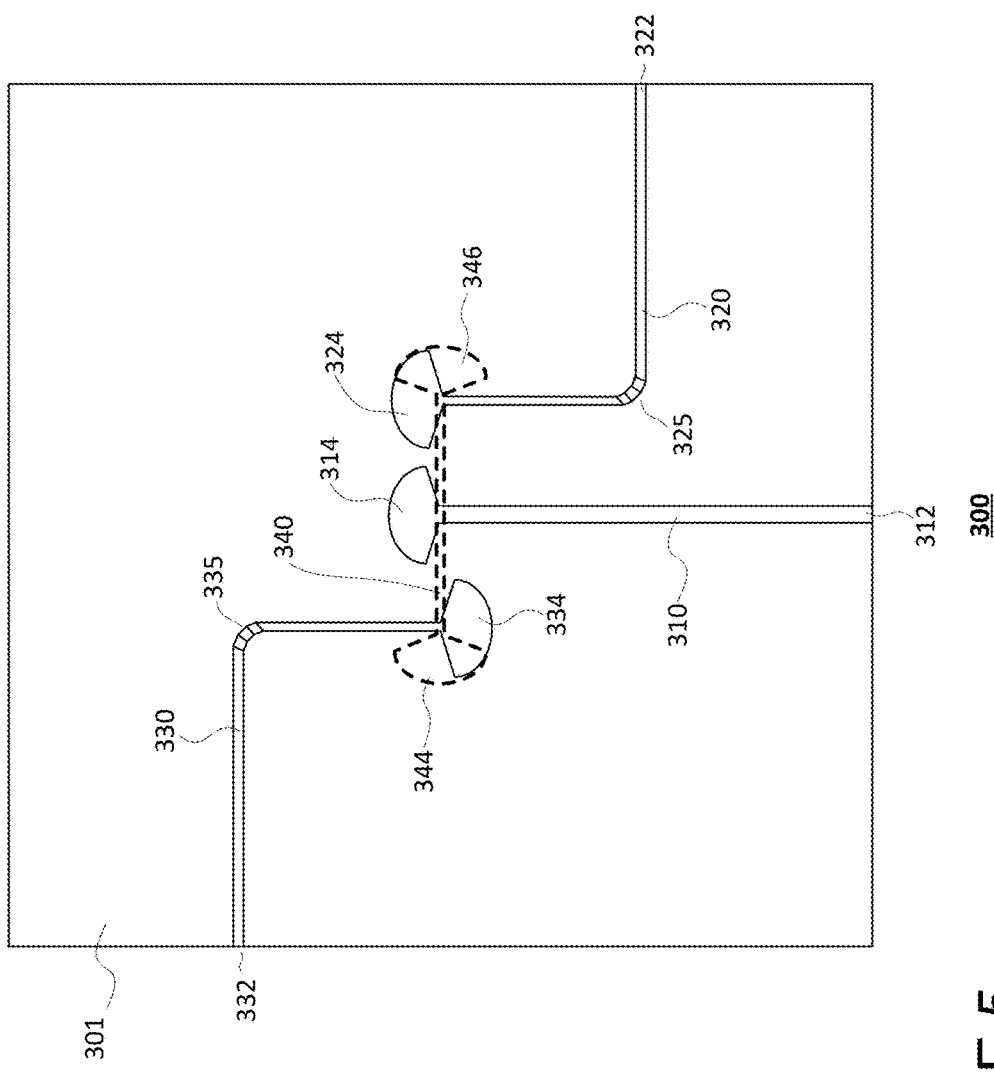
FIG. 5 is a plan view of yet another balun circuit in accordance with an aspect of the present disclosure.

FIG. 5 shows a third example balun circuit 300 in accordance with the present disclosure. The balun circuit 300 is formed on a dielectric substrate 301 with a ground plane, comparable to the substrates of the examples of FIGS. 1A and 3A.

The balun circuit 300 of FIG. 5 includes an input stripline 310 having a first end 312 (input port) and a second end 314 (radial stub). A root of the radial stub of the second end overlaps a midpoint of the slotline 340. The balun circuit also includes first and second output striplines 320 and 330. Each of the output lines includes a first end 322 and 332 (output ports), a second end 324 and 334 (radial stubs), and a bend 325 and 335 (as compared to the input stripline 310, which is straight). In the example of FIG. 5, the bend is about 90 degrees and mitered, but in other examples may have a different angle and/or a different type of bend (e.g., right angle, curved a single miter joint, etc.). The radial stub root of each second end 334, 324 overlap with the root of a radial stub at a respective end 344 and 346 of the slotline 340.

As with the example of FIG. 3A, each of the input port 312, and two output ports 322 and 332 are formed on different sides of the substrate 301. Specifically, a first output port 322 (associated with a first output stripline 320) is positioned on a first side of the substrate, a second output port 332 (associated with a second output stripline 330) is positioned on an opposite second side of the substrate, and the input port 312 is positioned on a third side of the substrate between the first and second sides.

In the example of FIG. 5, each of the input and output striplines 310, 320, 330, as well as the slotline 340, is of a uniform width (as compared to the example of FIG. 3A, in which each output stripline is tapered). Output lines 320, 330 are of the same length and width but may have a different width in comparison to the slotline and may have different width as that of the input stripline 310. The absence of tapers in the striplines improves the insertion/return loss of the balun by having a 50 ohms at the input and 70 ohms at each of the outputs, which creates a 140 ohm differential impedance between the two outputs. The 140 ohm differential impedance is especially beneficial for impedance matching with components having a similar impedance (e.g., in a mixer, a diode having an impedance of about 150 ohms across a broad range of frequencies). The 140 ohm differential impedance is also beneficial for improving the return loss of the balun circuit.

In the example of FIG. 5, the radial stubs of the input stripline 314 and output striplines 324 and 334 all have the same dimensions. Similarly, the radial stubs at the first and second ends 344 and 346 of the slotline 340 have the same dimensions. However, the dimensions of stubs 314, 324 and 334 are different than those dimensions of stubs 344 and 346.

As with the example balun circuit of FIG. 3A, several aspects of this example balun circuit 300 are also formed symmetrically to achieve the desired insertion loss and phase imbalance characteristics (discussed in connection with FIGS. 6A and 6B below). Those aspects include but are not limited to: the balun circuit 300 utilizing a single slotline 340 to transmit signals from the input stripline 310 to the first and second output striplines 320 and 330; the junction transition between the input stripline and the slotline being positioned at a midpoint of the slotline; the slotline being of a uniform width; the junction transitions between the slotline and each output stripline being positioned at an equal distance from the junction transition with the input stripline; and each of the output striplines being rotationally symmetrical to one another.

Operation of the balun circuit 300 of FIG. 5 is comparable to that of the balun circuit 200 of FIG. 3A. By aligning the output lines in opposite directions relative to the slotline, the difference in phase of the transmitted signals at each junction is approximately 180 degrees, thereby yielding the balanced output.

Figure 6A:
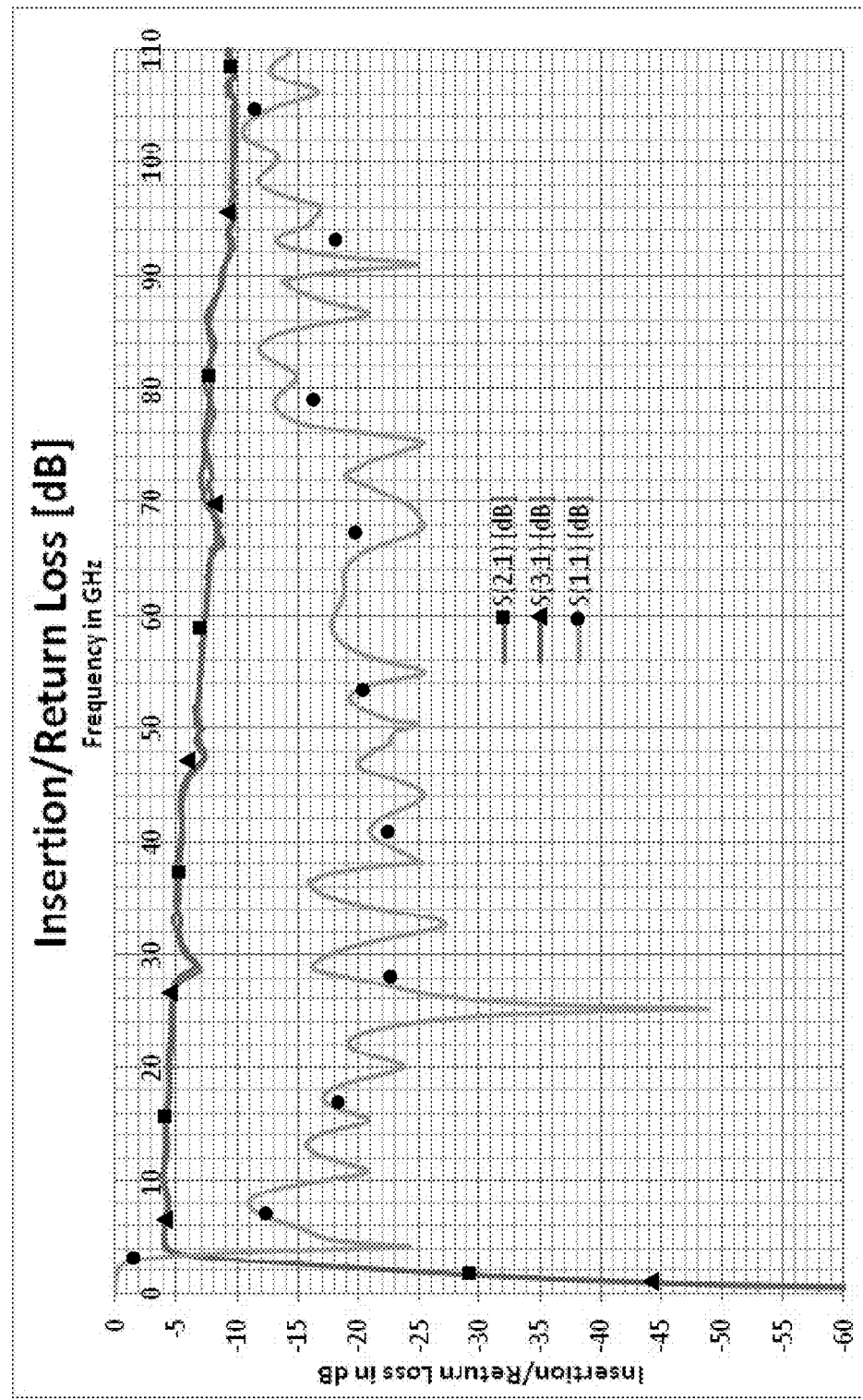
FIG. 6A is a graphical representation of loss characteristics of the balun circuit of FIG. 5.
Figure 6B:
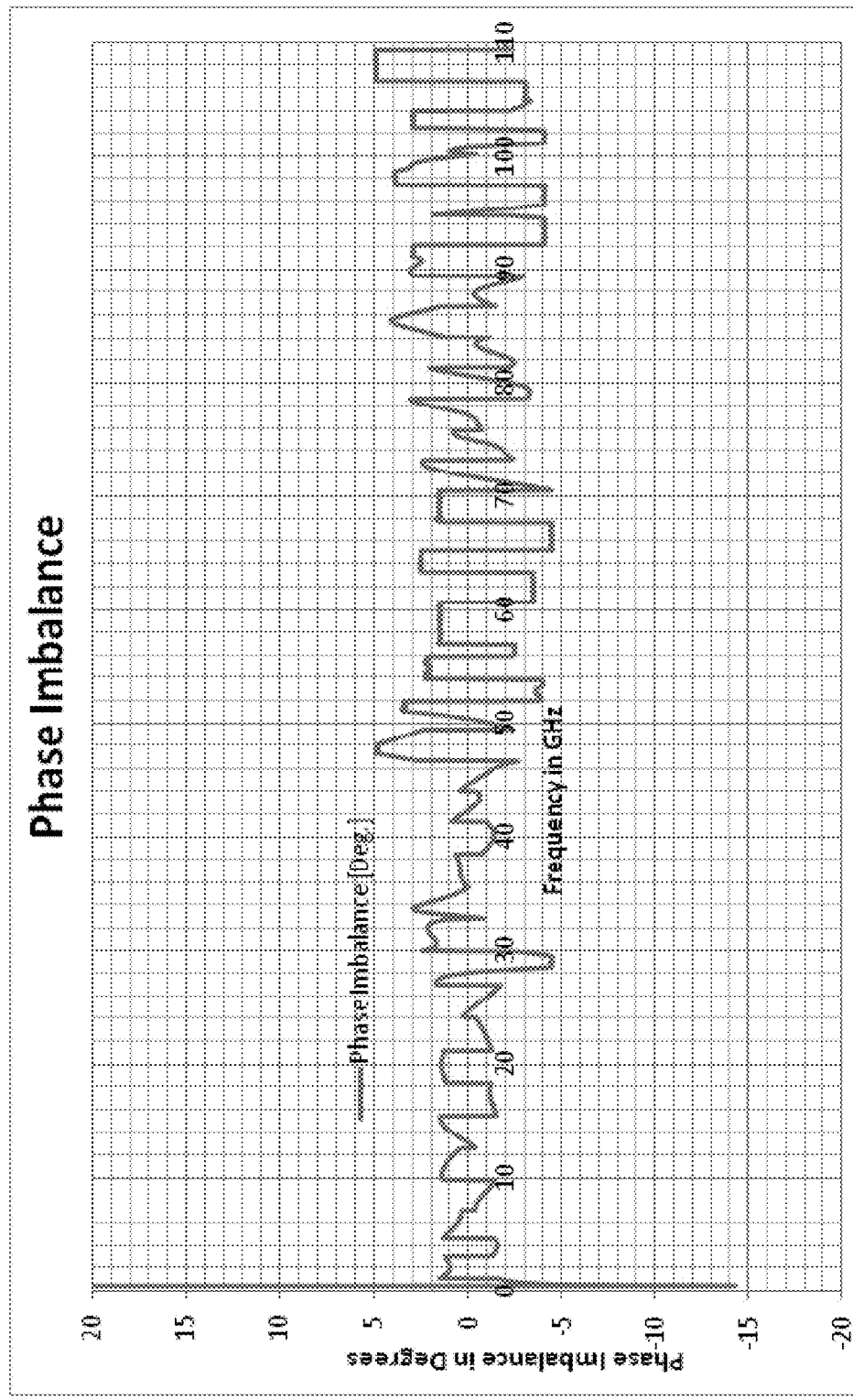
FIG. 6B is a graphical representation of phase imbalance characteristics of the balun circuit of FIG. 5.

FIGS. 6A and 6B show insertion loss and phase imbalance characteristics of the balun circuit of FIG. 5 over a range of frequencies. As shown in FIG. 6A, the amplitude balance of the balun circuit is about ±1 dB or less for frequencies up to about 110 GHz. Also, as shown in FIG. 4B, the phase balance of the balun circuit is about ±5.0 degrees for frequencies up to about 110 GHz. Therefore, the example balun of FIG. 5 may be used for frequencies between about 5 GHz and about 110 GHz (including frequencies greater than 11 GHz, as well as frequencies greater than about 45 GHz). The characteristics of FIGS. 6A and 6B are based on a balun circuit formed on a low-temperature co-fired ceramic substrate, although in other examples the balun circuit may have different properties. Although FIGS. 6A and 6B demonstrate amplitude balance for frequencies up to about 110 GHz, it has been shown that the above example balun circuit may be adapted to operate at any frequencies up to and including even about 200 GHz.

Figure 7A:
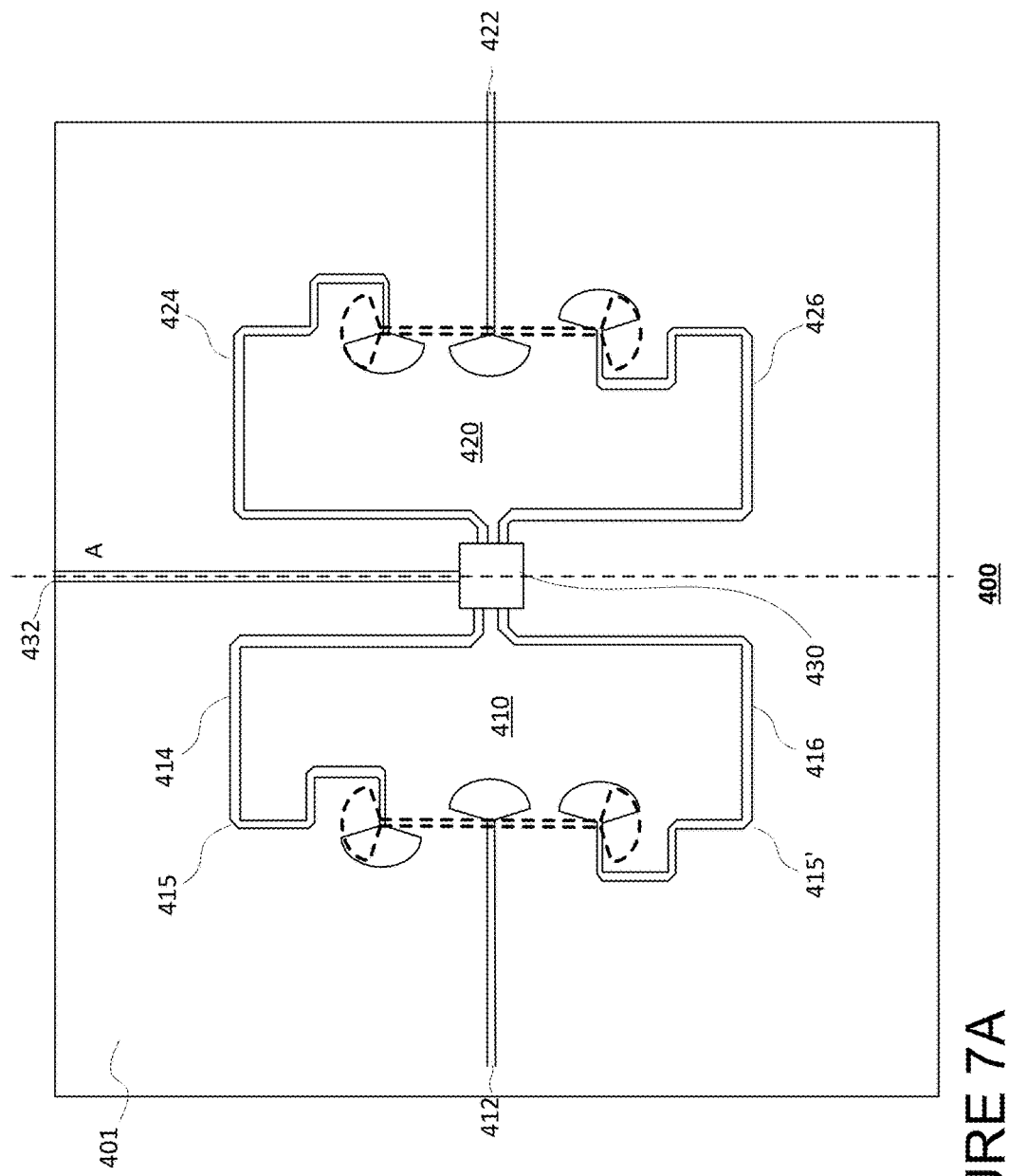
FIG. 7A is a plan view of a double balanced mixer circuit in accordance with an aspect of the present disclosure.
Figure 7B:
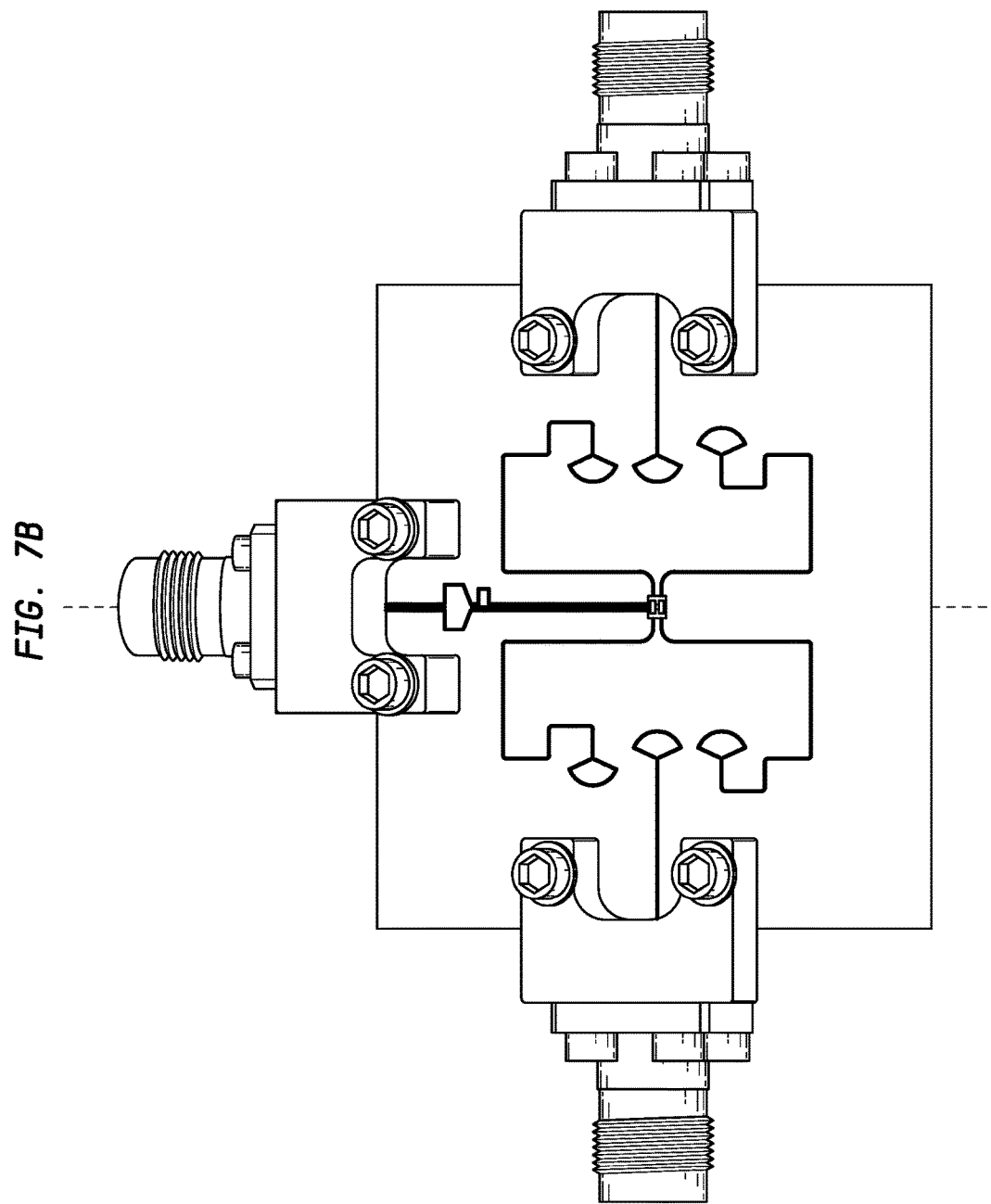
FIG. 7B is a perspective view of the double balanced mixer circuit of FIG. 7A.

FIGS. 7A and 7B shows an example application of the above-described balun circuit in accordance with another aspect of the disclosure. Specifically, the example application is a double balanced mixer circuit 400 using the balun design of FIG. 5. The mixer circuit is formed on a single substrate 401 and includes a first balun circuit 410 and a second balun circuit 420. The first balun circuit 410 includes a first input stripline 412 extending from a first side of the substrate 401, a first output stripline 414 and a second output stripline 416. The second balun circuit includes a second input stripline 422 extending from a second side of the substrate opposite the first side, a third output stripline 424 and a fourth output stripline 426. The first and second input stripline 412 and 422 function as first and second input ports of the mixer 400. The output striplines 414, 416, 424, and 426 are electrically connected to a switch or switch-like circuit (e.g., a crossover ring quad diode IC) 430 which controls operation of the mixer (e.g., mixing the output frequencies of the first and second balun circuits). The switch 430 provides the output of the mixer 430 over two lines that join together into one line at the output port 432. In the example of FIGS. 7A and 7B, the output port 432 is located on a third side of the substrate 401 between the first and second sides.

As with the design of the balun circuit 300 of FIG. 5, each of the input striplines of the mixer 400 is straight, and each of the output striplines is bent. However, other mixers within the scope of this disclosure may utilize other designs having different bends.

Several aspects of this mixer 400 are formed symmetrically (in addition to the symmetrical properties of the individual balun circuits, as described above) to achieve the desired conversion loss (i.e., radio frequency (RF) to intermediate frequency (IF)) characteristics. Those aspects include but are not limited to: the mixer 400 having a substantially symmetrical configuration along a primary axis A extending from the switch 430 to the output port 432; the first input stripline 412 and second input stripline 422 having both mirror and rotational symmetry with one another (e.g., over the primary axis A and around the center point of the substrate, respectively); the slotline of each balun circuit having both mirror and rotational symmetry with one another (e.g., over the primary axis A and around the center point of the substrate, respectively); the first output stripline 414 and fourth output stripline 426 being rotationally symmetrical to one another; and the second output stripline 416 and third output stripline 424 being rotationally symmetrical to one another. Additionally, the first output stripline 414 and second output stripline 416 are substantially rotationally symmetrical to one another, with every pair of corresponding bends (e.g., miter bends) of the two striplines being bent in the opposite direction, with the exception of one pair of corresponding bends 415 and 415' that are bent in the same direction. The purpose of bends 415 and 415' being bent in the same direction is to connect both striplines to the same switch instead of to opposite sides of the substrate while also maintaining the same electrical lengths of the two output striplines (as is done in the examples of FIGS. 3A and 5A). The third output stripline 424 and fourth output stripline 426 are similarly substantially rotationally symmetrical to one another.

The mixer shown in FIGS. 7A and 7B utilizes two of the third example balun circuit 300 of FIG. 5. However, other example balun circuits, such as those shown in FIGS. 1A and 3A, may also or alternatively be utilized.

Those having skill in the art will recognize that the features of one example balun circuit of the present disclosure may be utilized in other balun circuits without departing from the spirit and scope of the present disclosure. For one example, the tapered microstrips utilized in the example balun circuit of FIG. 3A may be utilized in other example balun circuits. For further example, the particular bends utilized in the respective output striplines (e.g., a curved bend in FIG. 1A, no bend in FIG. 3A, a 90 degree bend on FIG. 5), may be interchanged, and/or utilized for the input striplines. The particular open end discontinuities may also be interchanged, or replaced with other open end discontinuities (e.g., circular, flare, etc.).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A balun circuit comprising:
   a substrate;
   a first output stripline formed on a first surface of the substrate;
   a second output stripline formed on the first surface of the substrate;
   an input stripline formed on the first surface of the substrate; and
   a slotline formed on a second surface of the substrate opposite the first surface, the slotline having first and second ends, the first end overlapping the first output stripline and the second end overlapping the second output stripline, and the input stripline overlapping the slotline midway between the first end and the second end, thereby forming a respective stripline-to-slotline cross junction transition with each of the stripline input and the first and second output striplines,
   wherein at least one of the input stripline, the first output stripline, and the second output stripline extends from a side of the substrate to its respective stripline-to-slotline cross junction transition along a straight line,
   wherein each of the first output stripline, the second output stripline, the input stripline, and each end of the slotline includes a radial stub, and
   wherein the first output stripline and the second output stripline are substantially rotationally symmetrical with one another.

2. The balun circuit of claim 1, wherein the first and second output striplines are adapted to provide a characteristic impedance of about 70 ohms and a differential impedance of about 140 ohms.

3. The balun circuit of claim 2, wherein the balun circuit is adapted to operate at a frequency greater than about 11 GHz.

4. The balun circuit of claim 2, wherein the balun circuit is adapted to operate at a range of frequencies between about 5 GHz and about 45 GHz.

5. The balun circuit of claim 2, wherein the balun circuit is adapted to operate at a range of frequencies between about 5 GHz and about 110 GHz.

6. The balun circuit of claim 1, wherein the slotline overlaps the first output stripline at a respective root of the radial stubs of each of the first end and the first output stripline, and wherein the slotline overlaps the second output stripline at a respective root of the radial stubs of each of the second end and the second output stripline.

7. The balun circuit of claim 1, wherein each of the first and second output striplines is straight, and the input stripline is bent at an approximately 90 degree angle.

8. The balun circuit of claim 7, wherein each of the first and second output striplines is of a non-uniform width that gradually widens in the direction moving away from the slotline, and wherein the input stripline is of a uniform width.

9. The balun circuit of claim 1, wherein each of the first and second output striplines is bent at an approximately 90 degree angle, and the input stripline is straight.

10. The balun circuit of claim 1, wherein the first output stripline extends between the slotline and a first end of the substrate, the second output stripline extends between the slotline and a second end of the substrate opposite the first end, and the input stripline extends between the slotline and a third end of the substrate between the first and second ends.

11. A double balanced mixer circuit comprising:
a first and second balun circuit each using the balun circuit according to claim 1; and
a switch coupled to both of the first and second balun circuits and operative to mix respective output frequencies of the first and second balun circuits.

12. The double balanced mixer of claim 11, wherein the switch comprises a crossover quad diode ring.

13. The double balanced mixer circuit of claim 11, wherein the substrate of the first balun circuit and the substrate of the second balun circuit are a common substrate, and
wherein the input stripline of each of the first and second balun circuits is straight, and
wherein the input stripline of the first balun circuit extends between the slotline of the first balun circuit and a first end of the substrate, and the input stripline of the second balun circuit extends between the slotline of the second balun circuit and a second opposite end of the substrate.

14. The double balanced mixer circuit of claim 11, wherein the substrate of the first balun circuit and the substrate of the second balun circuit are a common substrate, and wherein the first and second balun circuit are rotationally symmetrical with one another.

15. The balun circuit of claim 1, wherein the balun circuit is adapted to operate at any frequency between about 5 GHz and about 200 GHz.

16. A balun circuit comprising:
a substrate;
a first output stripline formed on a first surface of the substrate;
a second output stripline formed on the first surface of the substrate;
an input stripline formed on the first surface of the substrate; and
a slotline formed on a second surface of the substrate opposite the first surface, the slotline having first and second ends, the first end overlapping the first output stripline and the second end overlapping the second output stripline, and the input stripline overlapping the slotline midway between the first end and the second end, thereby forming a respective stripline-to-slotline cross junction transition with each of the stripline input and the first and second output striplines,
wherein at least one of the input stripline, the first output stripline, and the second output stripline extends from a side of the substrate to its respective stripline-to-slotline cross junction transition along a straight line,
wherein each of the first output stripline, the second output stripline, the first end of the slotline, and the second end of the slotline terminates at a respective termination point,
wherein the slotline overlaps the first output stripline at a respective root of the termination points of each of the first end and the first output stripline, and wherein the slotline overlaps the second output stripline at a respective root of the termination points of each of the second end and the second output stripline, and
wherein the first output stripline and the second output stripline are substantially rotationally symmetrical with one another.

17. The balun circuit of claim 16, wherein the first and second output striplines are adapted to provide a characteristic impedance of about 70 ohms and a differential impedance of about 140 ohms.

18. The balun circuit of claim 17, wherein the balun circuit is adapted to operate at a frequency greater than about 11 GHz.

19. The balun circuit of claim 17, wherein the balun circuit is adapted to operate at a range of frequencies between about 5 GHz and about 45 GHz.

20. The balun circuit of claim 17, wherein the balun circuit is adapted to operate at a range of frequencies between about 5 GHz and about 110 GHz.

21. The balun circuit of claim 16, wherein each of the first and second output striplines is straight, and the input stripline is bent at an approximately 90 degree angle.

22. The balun circuit of claim 21, wherein each of the first and second output striplines is of a non-uniform width that gradually widens in the direction moving away from the slotline, and wherein the input stripline is of a uniform width.

23. The balun circuit of claim 16, wherein each of the first and second output striplines is bent at an approximately 90 degree angle, and the input stripline is straight.

24. The balun circuit of claim 16, wherein the first output stripline extends between the slotline and a first end of the substrate, the second output stripline extends between the slotline and a second end of the substrate opposite the first end, and the input stripline extends between the slotline and a third end of the substrate between the first and second ends.

25. The balun circuit of claim 16, wherein the balun circuit is adapted to operate at any frequency between about 5 GHz and about 200 GHz.

26. A double balanced mixer circuit comprising:
a first and second balun circuit each using the balun circuit according to claim 16; and
a switch coupled to both of the first and second balun circuits and operative to mix respective output frequencies of the first and second balun circuits.

27. The double balanced mixer of claim 26, wherein the switch comprises a crossover quad diode ring.

28. The double balanced mixer circuit of claim 26, wherein the substrate of the first balun circuit and the substrate of the second balun circuit are a common substrate, and
wherein the input stripline of each of the first and second balun circuits is straight, and
wherein the input stripline of the first balun circuit extends between the slotline of the first balun circuit and a first end of the substrate, and the input stripline of the second balun circuit extends between the slotline of the second balun circuit and a second opposite end of the substrate.

29. The double balanced mixer circuit of claim 26, wherein the substrate of the first balun circuit and the substrate of the second balun circuit are a common substrate, and wherein the first and second balun circuit are rotationally symmetrical with one another.

\* \* \* \* \*